(12) United States Patent
Kikukawa et al.

(10) Patent No.: US 8,304,678 B2
(45) Date of Patent: Nov. 6, 2012

(54) VACUUM INSULATED SWITCH-GEAR AND ITS HEIGHT ADJUSTING METHOD

(75) Inventors: Shuichi Kikukawa, Hitachi (JP); Kenji Tsuchiya, Hitachi (JP); Yuko Kajiyama, Hitachiota (JP); Daisuke Sugai, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 447 days.

(21) Appl. No.: 12/510,536

(22) Filed: Jul. 28, 2009

(65) Prior Publication Data
US 2010/0025376 A1 Feb. 4, 2010

(30) Foreign Application Priority Data

Jul. 30, 2008 (JP) ................... 2008-195611

(51) Int. Cl.
*H01H 33/66* (2006.01)
(52) U.S. Cl. ........................ 218/120; 218/154
(58) Field of Classification Search .......... 218/118–120, 218/140, 153, 154, 2–14, 43–45
See application file for complete search history.

(56) References Cited

U.S. PATENT DOCUMENTS

| 3,138,095 | A | 6/1964 | Wells | |
|---|---|---|---|---|
| 7,679,022 | B2 * | 3/2010 | Tsuchiya et al. | 218/120 |
| 2007/0228014 | A1 | 10/2007 | Tsuchiya et al. | |
| 2008/0067152 | A1 | 3/2008 | Kikukawa et al. | |
| 2008/0263968 | A1 * | 10/2008 | Day | 52/79.1 |

FOREIGN PATENT DOCUMENTS

| CN | 101034642 | 9/2007 |
|---|---|---|
| CN | 201038616 | 3/2008 |
| DE | 19811752 | 1/2000 |
| EP | 1814131 A2 | 8/2007 |
| JP | 04190605 | 7/1992 |
| JP | 69309 | 2/1994 |
| JP | 09284929 | 10/1997 |
| JP | 2002152930 | 5/2002 |
| JP | 2003009317 | 1/2003 |
| JP | 2006238522 | 9/2006 |
| JP | 2007-209077 | 8/2007 |
| JP | 2008104338 | 5/2008 |
| KR | 19990045259 | 6/1999 |

OTHER PUBLICATIONS

Specification for 25.8KV SF6 Gas-Insulated Metal-clad Switchgear, Electro Electric Systems, Hyundai Heavy Industries Co., Ltd., Nov. 1, 2001.

* cited by examiner

*Primary Examiner* — Amy Cohen Johnson
*Assistant Examiner* — Marina Fishman
(74) *Attorney, Agent, or Firm* — Brundidge & Stanger, P.C.

(57) ABSTRACT

The vacuum insulated switch-gear is configured to be capable of being lifted up with a jack-up bolt to adjust a seated height of the vacuum insulated switch-gear. The switch-gear comprises a nut fixed on a base plate forming a bottom of the vacuum insulated switch-gear. The nut is used as a mating component with the jack-up bolt.

6 Claims, 5 Drawing Sheets

VACUUM INSULATED SWITCH-GEAR AND ITS HEIGHT ADJUSTING METHOD

CLAIM OF PRIORITY

This application claims priority from Japanese application serial No. 2008-195611, filed on Jul. 30, 2008, the content of which is hereby incorporated by reference into this application.

BACKGROUND OF THE INVENTION

The present invention relates to a vacuum insulated switch-gear and its height adjusting method, and it is suitable to apply a vacuum insulated switch-gear assembly comprising plural vacuum insulated switch.

A vacuum insulated switch-gear is highly regarded for realizing downsizing, easy maintenance, environmental load reduction and the like.

A well-known vacuum insulated switch-gear is disclosed, for example, in a patent reference 1 (Japanese laid-open patent publication No. 2007-209077).

In the reference 1, disclosed is a vacuum insulated switch-gear comprising a switch making interruption and disconnection functions, a main circuit forming the switch, a solid insulated bus bar connected with one end of the main circuit conductor to supply power to the main circuit, a cable connected with the other end of the main conductor and connected with a load to supply the power to the load.

As the solid insulated bus bar has a good insulating performance, it makes possible to shorten a clearance between poles and thereby to contribute downsizing of the vacuum insulated switch-gear.

In general, with regard to several types of switch-gears, regardless of the vacuum insulated switch-gear, they are often arranged and connected to each other side by side in plural rather than alone. As practical modes of connecting the switch-gears to each other, several types of connection between bus bars, between a bus bar and cable, or between cables, are adopted.

In a vacuum insulated switch-gear described in the patent reference 1, the bus bar is structured by a solid insulated bus bar. The solid insulated bus bar is able to shorten an insulation distance between the solid insulated bus bars because the insulation ability thereof is better in comparison with the air insulation, therefore, it contributes to downsizing of the whole device. In addition, it also contributes to assure the safety of workers by covering a surface of the solid insulated bus bar with a conductive rubber maintained at ground potential. Accordingly, it is desired to use the solid bus bars in connecting the bus bars to each other.

The solid insulated bus bar has a structure in which a rod type copper wire is covered, for example, with a silicone rubber having insulating properties and a conductive rubber covering the silicone rubber while keeping the ground potential around the silicone rubber. The solid insulated bus bar having such a structure has no flexibility. Therefore, in the case that a dimensional error between adjacent the vacuum insulated switch gears is caused in a vertical direction of them, for example, it caused by factors that the seating place on which each of the vacuum insulated switch gear seated is not flat or the switch gear has a dimensional error by itself in size thereof in manufacturing process, and so on, the dimensional error cannot be absorbed.

As a result, if there is the dimensional error between adjacent the vacuum insulated, it may be difficult to connect the solid insulated bus bars of the adjacent vacuum insulated switch-gears to each other.

SUMMARY OF THE INVENTION

The present invention is to propose a vacuum insulated switch-gear and a method for adjusting its height, enabling to connect solid insulated bus bars of the adjacent vacuum insulated switch gears to each other, even if the dimensional error between the adjacent vacuum insulated switch gears is caused in the height direction of them To accomplish the above object, a vacuum insulated switch-gear of the present invention is configured as follows.

The present invention is applied to a vacuum insulated switch-gear comprising a fixed electrode and a movable electrode forming a main circuit of the switch-gear, a vacuum valve having a vacuum chamber and accommodating the main circuit, a bus bar electrically connected to the main circuit in the vacuum valve to supply the main circuit with electric power, and a cable electrically connected to the main circuit to supply the electric power to a load. That is, it is characterized in that the vacuum insulated switch-gear is configured to be capable of being lifted up with a height adjusting tool to adjust a seated height of the vacuum insulated switch-gear, and which further comprises a mating component for mating with the height adjusting tool when using the height adjusting tool.

For example, the mating component comprises a nut fixed on a base plate forming a bottom of the vacuum insulated switch-gear; and the vacuum insulated switch-gear is configured to be lifted up adjustably with a jack-up bolt as the height adjusting tool screwed into the nut.

Furthermore, a height adjusting plate is arranged between a base plate forming a bottom of the vacuum insulated switch-gear and a seating place on which the vacuum insulated switch-gear is seated; and the base plate of the vacuum insulated switch-gear is fastened on the seating place with a hold-down bolt through the adjusting plate.

In addition, to accomplish the above object, a method for adjusting the heights of plural vacuum insulated switch-gears comprises the followings.

The method is applied to plural vacuum insulated switch-gears of the above-mentioned invention and the plural vacuum insulated switch-gears are aligned side by side. That is, when aligning the vacuum insulated switch-gears side by side and connecting the adjacent vacuum insulated switch-gears to each other with a solid insulated bus bar, the adjustment of at least one of the seated heights of the adjacent vacuum insulated switch-gears is done by lifting up the vacuum insulated switch-gears with the height adjusting tool.

The method may further comprises the followings. That is, it is characterizing by, after adjusting the height of lifting of the vacuum insulated switch-gear adjacent to each other by means of the height adjusting tool, inserting a height adjusting plate between a base plate forming a bottom of the vacuum insulated switch-gear and a seating place on which the vacuum insulated switch-gear is seated.

According to the vacuum insulated switch-gear and its height adjusting method of the present invention, even if the dimensional error between adjacent vacuum insulated switch-gear is caused in the height direction of them, the height adjustment between/among the vacuum insulated switch-gear is able to be simply carried out on-site by using the height adjusting tool used for lifting up the vacuum insulated switch-gear from the seating place such as ground floor, or the like; and as a result, connection between the bus bars of the vacuum insulated switch-gears become possible.

DESCRIPTION OF THE PREFERRED EMBODIMENTS

Hereinafter, one embodiment of a vacuum insulated switch-gear related to the present invention is explained referring to drawings.

Figure 1:
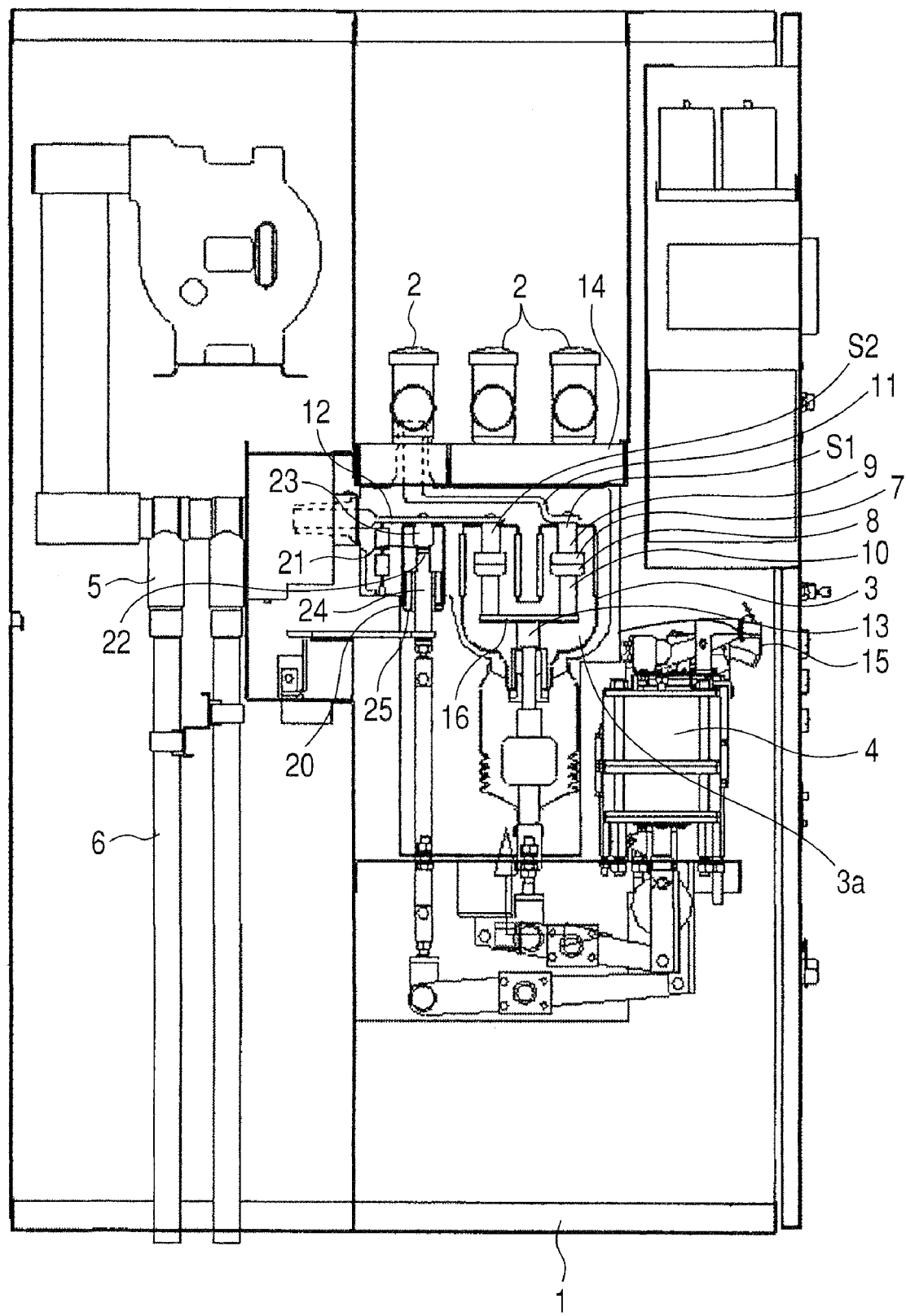
FIG. 1 is a side sectional view showing a vacuum insulated switch-gear in accordance with an embodiment of the present invention.

FIG. 1 shows a vacuum insulated switch-gear in accordance with the present invention. As shown in FIG. 1, the vacuum insulated switch-gear generally comprises a metal box 1 for accommodating components of the switch-gear, a vacuum valve 3 for each of three-phase (U, V and W phases), an earthing switch 20 for each of three-phase (U, V and W phases), tree-phase (U, V and W phases) bus bars 2 supplying electric power to the respective vacuum valves 3 and a cable 6 for each of three-phase (U, V and W phases) supplying the power to a load. Each vacuum valve 3 and each earthing switch 20 are accommodated within the metal box 1.

The vacuum valve 3 comprises two pairs of switch components S1 and S2 as a main circuit of the switch gear. One switch component S1 comprises a fixed electrode 7, a movable electrode 8 opposed to the fixed electrode 7, a fixed electrode rod 9 having one end connected to the fixed electrode 7 and the other end connected to a bus bar side-connection conductor 11, a movable electrode rod 10 having one end connected to the movable electrode 8 and the other end connected to a support conductor 16, the support conductor (support member) 16 having one end connected to the movable electrode rod 10 and the other end connected to an insulated rod 13, and the insulated rod 13 having one end connected to the support conductor 16 and the other end connected to a actuator 4. These components are accommodated into a vacuum chamber 3a of the vacuum valve 3. The movable electrode 8 is actuated by the actuator 4 via the movable electrode rod 10, support conductor 16, and the insulated rod 13 to make contact and non-contact to the fixed electrode 7.

The other switch component S2 has also a fixed electrode 7, a movable electrode 8, a fixed electrode rod 9, and a movable electrode rod 10 as well as the switch component S1. In the switch component S1, the fixed electrode 7 is connected to a load connection conductor 12, and the movable electrode 8 is connected to the support conductor 16 just as with S1.

The three-phase bus bars 2 are supported to a support member 14 over upper portions of both of the vacuum valve 3 and earthing switch 20, and near the middle position of the metal box 1. The support member 14 is fixed to the metal box 1 of the vacuum insulated switch-gear. Also, the fixed electrode 7 in a switch section for each phase having both of interrupting and disconnecting functions is connected to each of the bus bars 2 via a bus bar side-connection conductor 11. The shape of the bus bar connection conductor 11 for each phase is the same as that for the other phase.

The earthing switch 20 comprises a fixed electrode 21, a movable electrode 22 opposed to the fixed electrode 21, a fixed electrode rod 23 having one end connected to the fixed electrode 21 and the other end connected to the load connection conductor 12, and a movable electrode 24 on an earth side having one end connected the movable electrode 22 and the other end connected to an actuator 4. These components are accommodated into a vacuum chamber 25 of the earthing switch 20. The movable electrode 22 is actuated by the actuator 4 via the movable electrode rod 23.

The vacuum chamber 3a of the vacuum valve 3 and the vacuum chamber 25 of the earthing switch 20 are integrally molded with a molded resin 15.

Figure 2:
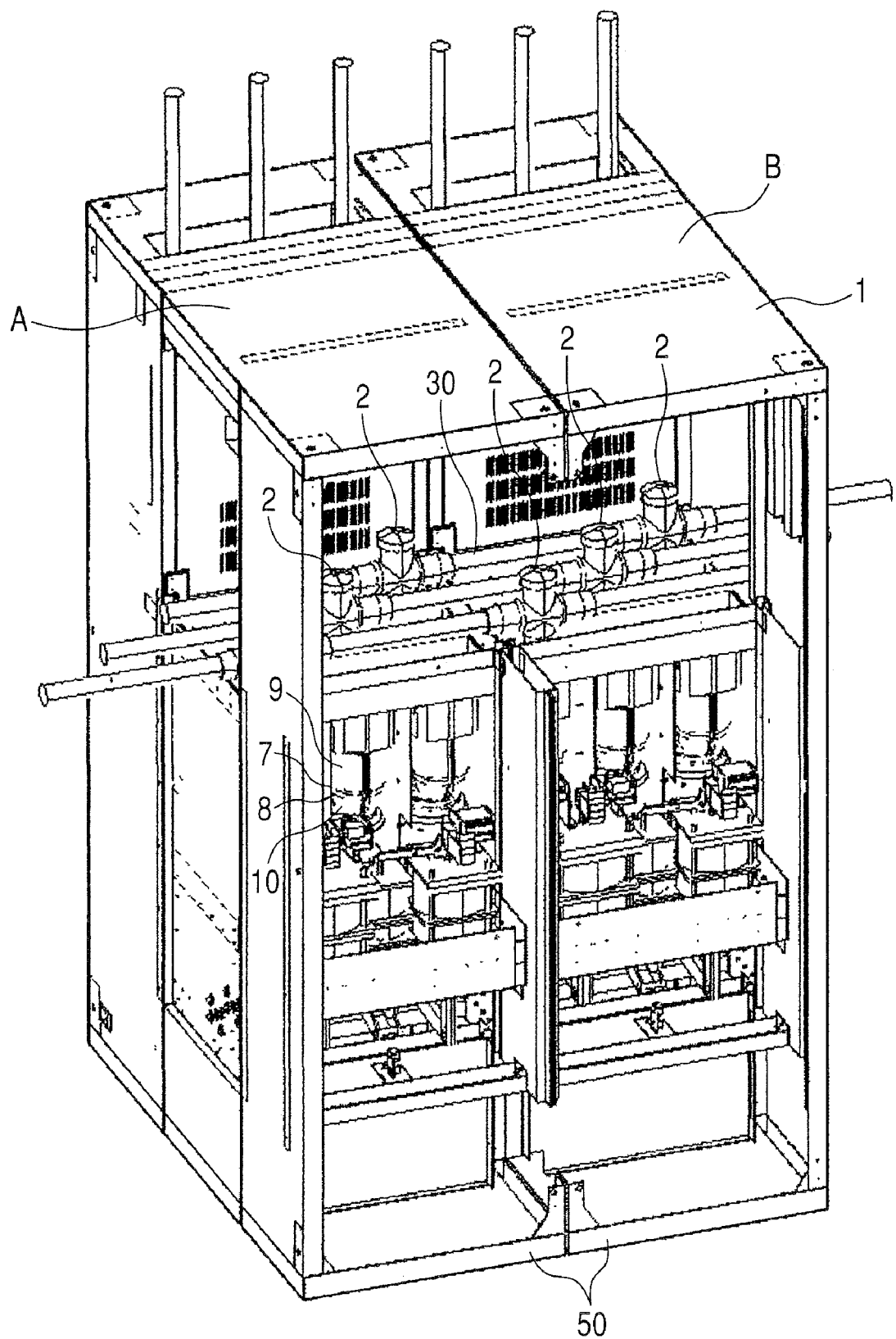
FIG. 2 is a partially broken perspective view showing a vacuum insulated switch-gear assembly comprising plural vacuum insulated switch-gear of the embodiment aligned side by side.

FIG. 2 shows a switch-gear assembly comprising plural vacuum insulated switch-gears A and B each whose configurations is explained in FIG. 1, they are aligned side by side, wherein the adjacent vacuum insulated switch-gears are connected to each other with each of solid insulated bus bars 30 for three-phase. Here, FIG. 2 although shows two vacuum insulated switch-gears, it may be two or more.

In FIG. 2, each bus bar 2 of adjacent two vacuum insulated switch-gears A and B is connected to the other by each solid insulated bus bar 30. Two (plural) metal boxs 50 (vacuum insulated switch-gears A and B) are aligned without a gap as shown in FIG. 2.

In addition, the solid insulated bus bar 30 has a structure covering a rod type cupper wire with an insulating rubber such as silicone rubber or an insulating resin and a conductive rubber covering the insulating rubber or the insulating resin thereby to make a ground potential around the insulating rubber or the insulating resin.

Figure 3:
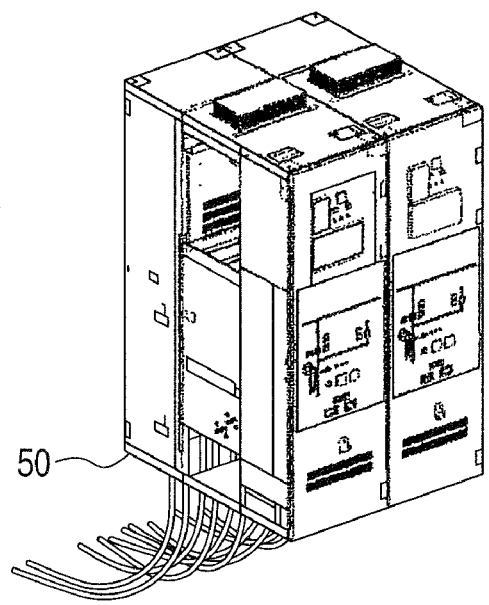
FIG. 3 is a perspective view showing the vacuum insulated switch-gears of the embodiment aligned side by side.
Figure 4:
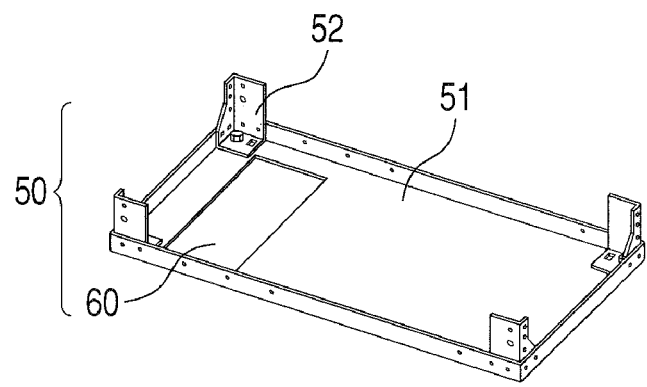
FIG. 4 is a perspective view showing a base portion adopted to the vacuum insulated switch-gear of the embodiment.
Figure 5:
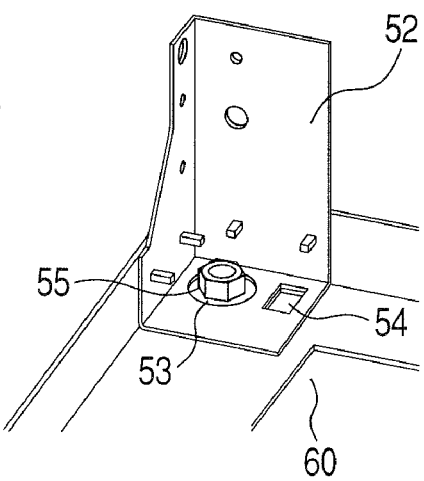
FIG. 5 is a partial perspective view shows a partially enlarging base portion of FIG. 4.

Also, a base portion 50 disposed at the bottom of the vacuum insulated switch-gear in accordance with the present embodiment is a structure shown in FIG. 3 through 5. That is, as shown in FIG. 4, the base portion 50 has a bottom structured by a base plate 51 with a cut out portion 60 so as to be capable of pulling out the cable. At four corners of the base the base 51, connectors 52 for connecting each base plate 51 and a main body of each vacuum switch-gear to each other, are attached to the base plate 51 by four rivets.

As shown in FIG. 5, two holes 53 and 54 are formed on the bottom of each connector 52. The hole 53 is used as a through hole for a nut 55 welded to the bottom of the base plate 51 at each corner of the base plate 51. The nut 55 is used as a mating component for a jack-up bolt 56 (refer to FIGS. 6-9) as the height adjusting tool. The hole 54 is used as a through hole for a hold-down bolt 57 as a fastening member for fixing the vacuum insulated switch-gear after adjusting a seated height of the vacuum insulated switch-gear as described later.

Next, a procedure for adjusting the seated height of the vacuum insulated switch-gear is explained referring to FIGS. 6 to 12.

As described above, if there is a dimensional error caused due to any reason on the height between the adjacent metal boxes (namely between the adjacent switch-gears A and B) in the case of connecting the bus bars 2 of the adjacent metal box to each other, it is not able to connect the bus bars in a situation of using the solid insulated bus bar 30 because the solid insulated bus bar has no flexibility.

Figure 6:
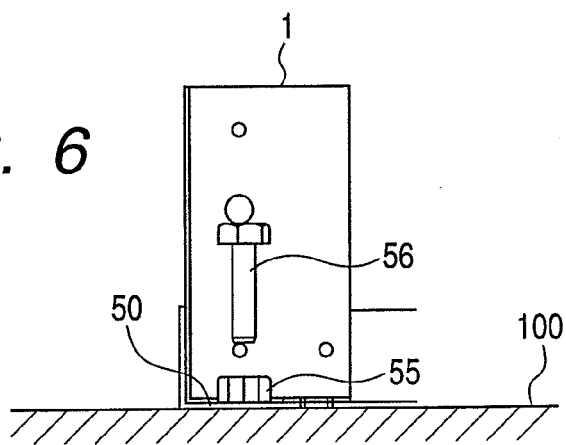
FIG. 6 is a drawing explaining first stage of the height adjustment of the vacuum insulated switch-gear of the embodiment.
Figure 7:
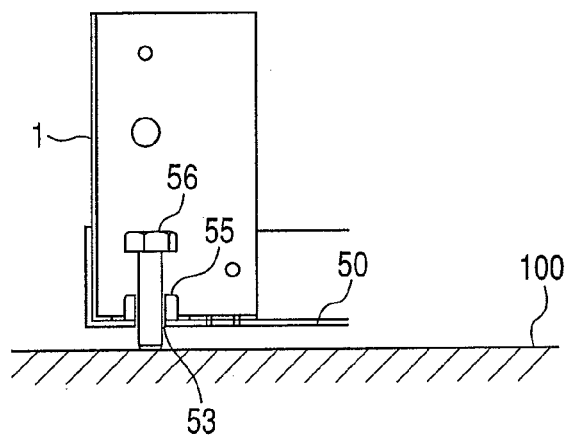
FIG. 7 is a drawing for explaining second stage of the height adjustment of the vacuum insulated switch-gear of the embodiment.

In order to meet the above-mentioned problem, in the present embodiment, as shown in FIG. 6, the jack up bolt 56 as the seated height adjusting tool is inserted and screwed into the nut 55 welded to the bottom surface of the base plate 51. By screwing the jack up bolt 56 in the nut in the predetermined direction (for example a clockwise direction), the jack up bolt 56 lifts up the metal box 1 (namely the vacuum insulated switch-gear) upwardly on a seating place 100 as shown in FIG. 7. The moving distance (namely seated height) of the lifting-up of the vacuum insulated switch-gear corresponds to a length in which the jack-up bolt 56 protrudes downwardly through the base portion 50 (base plate 51). Therefore, the jack-up bolt plays a role as lifting means for the vacuum insulated switch-gear. At that time, by adjusting the screwing degree of the jack-up bolt, namely the movement distance of the metal box from the seating place 100 at four corners of the base portion 50, the dimensional error of the height as to the switch-gear is corrected so as to be able to connect the solid insulated bus bars of the adjacent switch-gear to each other.

Figure 8:
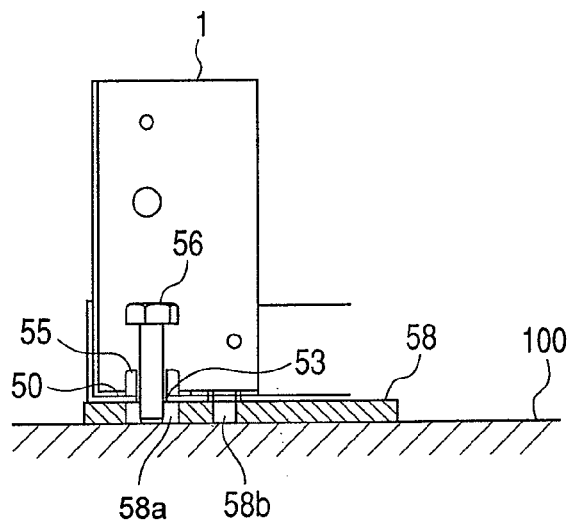
FIG. 8 is a drawing for explaining third stage of the height adjustment of the vacuum insulated switch-gear of the embodiment.

At the state of lifting up the vacuum insulated switch-gear on the seating place by the adjustment of the screwing degree of the jack-up bolts 56 at the four corners, as shown in FIG. 8, an adjusting plate 58 with thickness nearly equal to the lifting-up height of the switch-gear is inserted into a gap between the base portion 50 and the seating place 100. The adjusting plate 58 is provided with a slit 58a with a width at least larger than a diameter of the jack-up bolt 56 beforehand so as to avoid from interference of the jack-up bolt 56 when inserted. In addition, the adjusting plate 58 is provided with a through hole 58b for the hold-down bolt 57.

Figure 9:
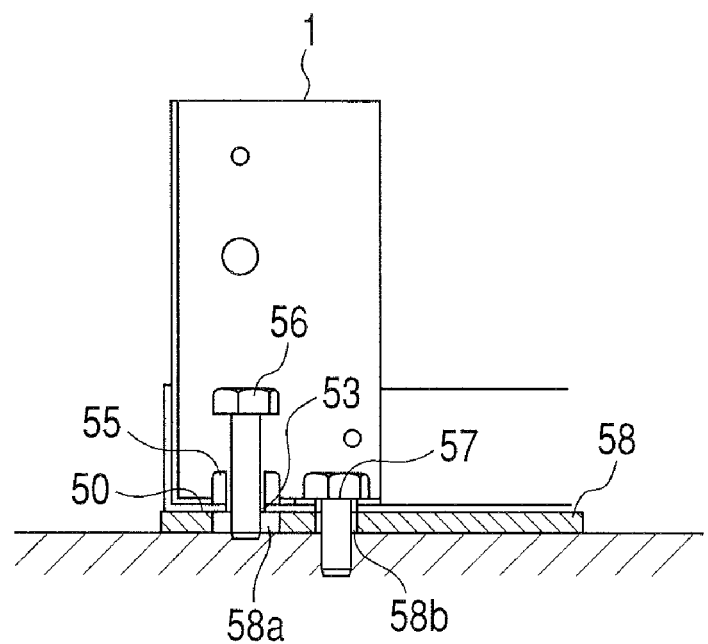
FIG. 9 is a drawing for explaining fourth stage of the height adjustment of the vacuum insulated switch-gear of the embodiment.
Figure 10:
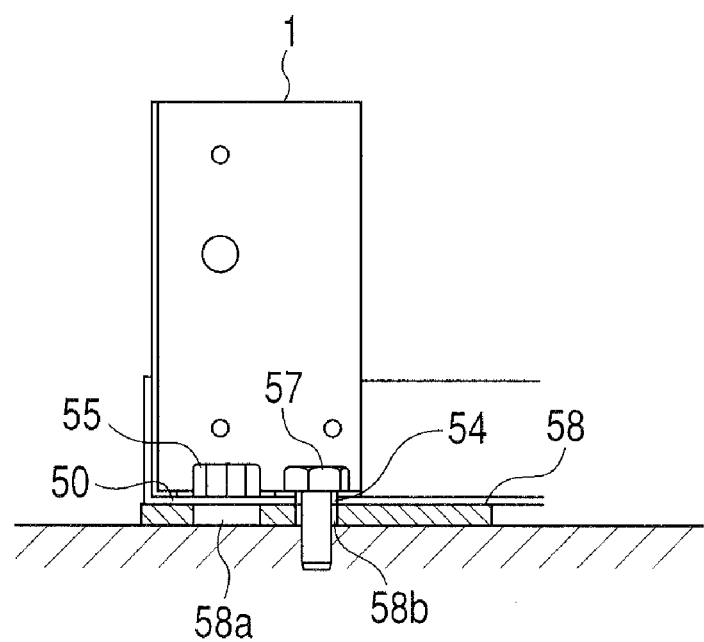
FIG. 10 is a drawing for explaining fifth stage of the height adjustment of the vacuum insulated switch-gear of the embodiment.

After inserting the adjusting plate 58 into a gap between the base portion 50 and the seating place 100 in FIG. 9, the hold-down bolt 57 is fastened to fix the base portion 50 to the seating place 100 through the adjusting plate 58. Then, the jack-up bolt 56 is removed from the nut 55 as shown in FIG. 10. Accordingly, it is able to adjust the dimensional error of the height of the adjacent vacuum insulated switch-gears and by adjusting the dimensional error on the height, it is possible to connect the neighboring vacuum insulated switch-gears with the solid insulated bus bar 30.

In the present embodiment, all of the three-phase bus bars are supported near the middle position of the whole metal box and therefore, distance from the bottom end of the vacuum insulated switching gear to the position of each phase bus bar 2 is not so much different in every phase. Accordingly when the bottom end of the vacuum insulated switch-gear is lifted up through the base 50, for example, any end portion in the four corners is lifted up, the distance from the end portion is not far away in comparing with the case which the three-phase bus bars are positioned on the upper end of the metal box, and displacement of the position of each phase bus bar corresponding to the upward or downward movement of the jack-up bolt 56 does not become large and the fine adjustment is possible.

In addition, as the vacuum valve 3 which has heavier weight in the whole parts of the switch gear is positioned in the middle position of the metal box, the center of gravity of the switch gear approaches to the middle position of the metal box and therefore, when the four corners of the base portion are lifted up, risk of the board fall down is reduced.

In the present embodiment, as the three-phase bus bars 2 are integrally supported to a support portion 14 fixed to the metal box 1 of the vacuum insulated switch-gear portion 14, therefore, the bus bars 2 of each phase follows moving of the switch gear itself. According to this, by adjusting the height of the vacuum insulated switch-gear itself as shown above, the height of the bus bar is also adjusted following the vacuum insulated switch-gear.

What is claimed is:

1. A vacuum insulated switch-gear comprising:
   a fixed electrode and a movable electrode forming a main circuit of the switch-gear;
   a vacuum valve having a vacuum chamber and accommodating the main circuit;
   a bus bar electrically connected to the main circuit in the vacuum valve to supply the main circuit with electric power; and
   a cable electrically connected to the main circuit to supply the electric power to a load,
   wherein the vacuum insulated switch-gear is configured to be capable of being lifted up with a jack-up bolt to adjust a seated height of the vacuum insulated switch-gear, and which further is comprised of:
   a nut fixed at each corner of a base plate forming a bottom of the vacuum insulated switch-gear to screw the jack-up bolt through the nut,
   a height adjusting plate arranged under at least one of corners of the base plate between the base plate and a seating place on which the vacuum insulated switch-gear is seated,
   a hold-down bolt for fastening the base plate on the seating place through the height adjusting plate, and
   a base plate-side through hole provided at each corner of the base plate to allow the hole-down bolt to go therethrough,
   wherein the base-plate through hole is provided at the corner of the base plate together with the nut, and
   wherein the height adjusting plate is provided with a slit having a width larger than a diameter of the jack-up bolt together with a height adjusting plate-side through hole for the hold-down bolt so that the height adjusting plate can be avoided from interference of the jack-up bolt by the slit when the height adjusting plate is inserted between the base plate and the seating place.

2. The vacuum insulated switch-gear according to claim 1, further comprising:
   a metal box for accommodating components of the switch-gear;
   three-phase bus bars of U phase, V phase and W phase electrically connected to the main circuit conductor to supply electric power to the main circuit; and
   a support member supporting the three-phase bus bars and fixed to the metal box,
   wherein said three-phase bus bars are integrally supported in the metal box.

3. The vacuum insulated switch-gear according to claim 1, wherein the height adjusting plate has a thickness nearly equal to a seated height of the vacuum insulated switch-gear up to which the vacuum insulated switch-gear is lifted up from the seating place by the jack-up bolt.

4. A switch-gear assembly comprising plural vacuum insulated switch-gears according to claim 1 being aligned side by side, wherein adjacent vacuum insulated switch-gears are connected to each other with a solid insulated bus bar.

5. The switch-gear assembly according to claim 4, wherein the solid insulated bus bar has a structure covering a rod type cupper wire with an insulating rubber or an insulating resin and a conductive rubber covering the insulating rubber or the insulating resin thereby to make a ground potential around the insulating rubber or the insulating resin.

6. A method for adjusting seated heights of plural vacuum insulated switch-gears according to claim 1 when aligning the vacuum insulated switch-gears side by side and connecting the adjacent vacuum insulated switch-gears to each other with a solid insulated bus bar, wherein the adjustment of at least one of the seated heights of the adjacent vacuum insulated switch-gears is done by lifting up at least one of the vacuum insulated switch-gears with the jack-up bolt being screwed through the nut in the base plate;

inserting the height adjusting plate between the base plate and the seating place so as to avoid from interference of the jack-up bolt by locating the slit around the jack-up bolt;

fastening the base plate of the vacuum insulated switch-gear on the seating place by screwing the hold-down bolt via the through holes of the base plate and the height adjusting plate; and then removing the jack-up bolt from the vacuum insulated switch-gear.

* * * * *